(12) United States Patent
Kodama et al.

(10) Patent No.: US 8,859,152 B2
(45) Date of Patent: Oct. 14, 2014

(54) AIR BATTERY

(75) Inventors: Tomoki Kodama, Toyota (JP);
Fuminori Mizuno, Toyota (JP); Yutaka Hirose, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 557 days.

(21) Appl. No.: 13/144,853

(22) PCT Filed: Feb. 19, 2009

(86) PCT No.: PCT/JP2009/052852
§ 371 (c)(1),
(2), (4) Date: Jul. 15, 2011

(87) PCT Pub. No.: WO2010/095229
PCT Pub. Date: Aug. 26, 2010

(65) Prior Publication Data
US 2011/0300456 A1    Dec. 8, 2011

(51) Int. Cl.
*H01M 12/00* (2006.01)
*H01M 12/02* (2006.01)
*H01M 12/04* (2006.01)
*H01M 12/06* (2006.01)
*H01M 12/08* (2006.01)
*H01M 10/48* (2006.01)
*H01M 4/38* (2006.01)

(52) U.S. Cl.
CPC .......... *H01M 12/065* (2013.01); *H01M 10/488* (2013.01); *H01M 12/08* (2013.01); *H01M 10/48* (2013.01); *H01M 4/381* (2013.01)
USPC ........................................................ 429/403

(58) Field of Classification Search
USPC .................................................. 429/402–407
See application file for complete search history.

(56) References Cited

U.S. PATENT DOCUMENTS 3,563,806 A * 2/1971 Hruden ............................ 429/90
5,415,949 A * 5/1995 Stone et al. ...................... 429/63
2004/0241537 A1* 12/2004 Okuyama et al. ................ 429/86

FOREIGN PATENT DOCUMENTS

| EP | 1 717 890 A1 | 11/2006 |
| JP | A-10-172579 | 6/1998 |
| JP | A-2000-209787 | 7/2000 |
| JP | A-2005-327541 | 11/2005 |
| JP | A-2007-299671 | 11/2007 |
| JP | A-2008-305716 | 12/2008 |

OTHER PUBLICATIONS

Written Opinion of the International Searching Authority dated Mar. 31, 2009 in International Application No. PCT/JP2009/052852 (with partial translation).
International Search Report dated Mar. 31, 2009 in International Application No. PCT/JP2009/052852.

* cited by examiner

*Primary Examiner* — Kenneth Douyette
*Assistant Examiner* — James Lee
(74) *Attorney, Agent, or Firm* — Oliff PLC

(57) ABSTRACT

An air battery which is capable of detecting entering of water quickly. The air battery includes: a power section which includes an air electrode, an anode containing an alkali metal, and an electrolyte layer containing an electrolyte for conducting ion between the air electrode and the anode; and a housing configured to receive the power section, a pH-detecting means being provided inside the housing.

7 Claims, 3 Drawing Sheets

AIR BATTERY

TECHNICAL FIELD

The present invention relates to an air battery.

BACKGROUND ART

An air battery is a battery employing oxygen as a cathode active material; at the time of discharge, air is introduced from outside the battery. So, compared with other type of batteries which incorporate active materials for both cathode and anode, it is possible to enlarge the occupancy rate of the anode active material in the battery case. Hence, in principle, such an air battery has features that dischargeable electric power is large and that downsizing and weight saving can be easily realized. In addition, oxidation power of oxygen to be employed as the cathode active material is strong so that the electromotive force is relatively high. Moreover, since oxygen is a clean resource the amount of which is not limited, the air battery is environmentally-friendly. As above, air battery has many advantages; therefore it is expected to be used for batteries for, for example, hybrid cars and mobile devices.

When water enters into an air battery using metal as the anode in emergency situations, the water and the metal tend to react. If the water and the metal react in this way, it is predicted that the air battery may be deteriorated. So, to inhibit deterioration of the air battery, presumably, it is important to detect the entering of water into the air battery quickly.

As a technique regarding such an air battery, for example, Patent document 1 discloses an air battery in which low-voltage alarm sounds when the detected voltage becomes equal to or less than the threshold level.

Patent Document 1: Japanese Patent Application Laid-Open (JP-A) No. 2000-209787

DISCLOSURE OF THE INVENTION

Problems to be Solved by the Invention

With the technique disclosed in the Patent document 1, since the low-voltage alarm sounds when the detected voltage becomes equal to or less than the threshold level, it is possible to easily find out whether or not the voltage of the air battery is equal to or less than the threshold level. However, the operating voltage of the air battery does not vary even when water enters into the air battery. Due to this, by the technique disclosed in the Patent document 1, it is difficult to detect entering of water into the air battery quickly.

Accordingly, an object of the present invention is to provide an air battery which is capable of detecting entering of water quickly.

Means for Solving the Problems

In order to solve the above problem, the present invention takes the following means. In other words, the present invention is an air battery comprising: a power section which comprises an air electrode, an anode containing an alkali metal, and an electrolyte layer containing an electrolyte for conducting ion between the air electrode and the anode; and a housing configured to receive the power section, a pH-detecting means being provided inside the housing.

In the invention, the form of the "pH-detecting means" is not particularly limited as long as it can detect pH variation attributed to an alkaline substance produced by reaction of an alkali metal and water entered into the housing. Specific examples of the pH-detecting means in the invention include: a pH meter and a pH indicator.

In the above invention, preferably, the pH-detecting means contains a pH indicator and a window which allows for visually observing the pH indicator from outside the housing is provided to the housing.

Moreover, in the above invention where the pH-detecting means contains a pH indicator and a window which allows for visually observing the pH indicator from outside the housing is provided to the housing, the pH indicator is preferably mixed in the electrolyte layer.

Further, in the above invention, the air battery preferably further comprises an output means which outputs electronic signals when a pH value detected by the pH-detecting means exceeds the threshold level.

Effects of the Invention

The air battery of the present invention is provided with a pH-detecting means. Because of this, it is possible to detect pH variation attributed to an alkaline substance produced by reaction of an alkali metal and water entered into the battery. By detecting pH, it is possible to detect the entering of water into the battery quickly; accordingly, with the invention, it is possible to provide an air battery which is capable of detecting entering of water quickly.

In addition, in the invention, by a configuration in which the pH-detecting means contains a pH indicator and a window which allows for visually observing the pH indicator from outside the housing is provided to the housing, detection of entering of water becomes easier.

Moreover, in the invention, by a configuration in which the pH indicator is mixed in the electrolyte layer in contact with the anode, detection of entering of water becomes easier.

Further, in the invention, by a configuration comprising an output means which outputs electronic signals when a pH value exceeds the threshold level, detection of entering of water becomes easier.

Figure 1:
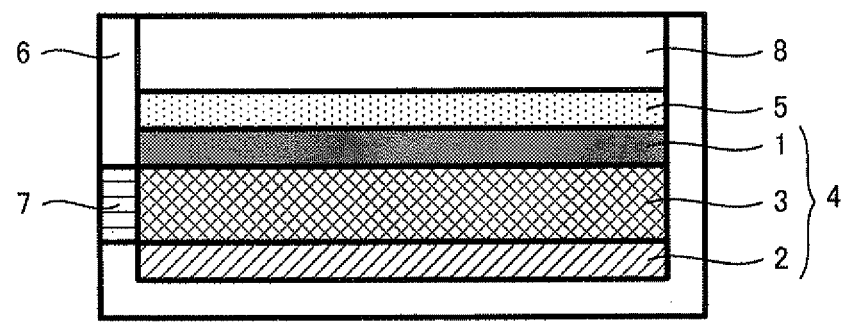
FIG. 1 is a cross-sectional view showing an embodiment of an air battery 10.

DESCRIPTION OF THE REFERENCE NUMERALS 1 air electrode
2 anode
2a anode
2b anode
3 electrolyte layer
4 power section
5 oxygen layer
6 housing
7 window
8 space
10 air battery
20 air battery
21 housing
22 electrolytic solution (electrolyte layer)
23 stacked structure
24 window 25 oxygen layer
26 oxygen flow path
27 space
30 air battery
31 flow path
32 stacked structure
33 housing
34 container
35 pH meter (pH-detecting means)
36 output means
37 air electrode

BEST MODE FOR CARRYING OUT THE INVENTION

When water enters into the power section of an air battery in emergency situations, the air battery is deteriorated. However, conventionally proposed air batteries have difficulty detecting the entering of water quickly. As a result of intensive study by the inventors, they discovered that it is possible to detect pH variation attributed to the substance produced by reaction of alkali metal of the power section and the entered water by the configuration having a pH detecting means; thereby possible to detect the entering of water quickly. By detecting entering of water quickly, it is presumably possible to inhibit deterioration of the air battery.

The present invention has been completed by the finding. The main object of the present invention is to provide an air battery which is capable of detecting the entering of water quickly.

Hereinafter, the present invention will be described with reference to the drawings. It should be noted that the embodiments shown below are examples of the present invention, so that the invention is not limited by the embodiments.

1. First Embodiment

FIG. 1 is a cross-sectional view schematically showing an embodiment of an air battery 10. FIG. 1 extracts a part of the air battery 10 and enlarges the part.

As shown in FIG. 1, the air battery 10 comprises: a power section 4 which comprises an air electrode 1, an anode 2, and an electrolyte layer 3 arranged between the air electrode 1 and the anode 2; an oxygen layer 5 arranged at the air electrode 1 side; and a housing 6 configured to receive the power section 4 and the oxygen layer 5. In the air battery 10, the anode 2 contains a substance which is capable of discharging or storing/discharging alkali metal ion (i.e. an element or a compound of the alkali metal, hereinafter, referred to as "alkali metal"); a pH indicator is mixed in the electrolyte layer 3. The housing 6 is provided with a window 7 which allows for visually observing the electrolyte layer 3 from outside the housing 6. The window 7 is provided with a transparent member that does not react with the constituent material of the power section 4. By the housing 6 and the window 7, a space outside the air battery 10 and the power section 4 are separated. In a space 8 between the upper face of the housing 6 and the oxygen layer 5, an oxygen-containing gas is filled.

When water entering into the housing in emergency situations reacts with an alkali metal contained in the anode 2, an alkaline substance is produced. For example, when the anode 2 contains lithium, reaction of the lithium with water produces LiOH; aqueous solution of LiOH is alkaline. As shown in FIG. 1, the anode 2 and the electrolyte layer 3 are in contact with each other; so, when an alkaline substance is produced by the reaction of the anode 2 with water, the electrolyte layer 3 also becomes alkaline. As described above, a pH indicator is mixed in the electrolyte layer 3. Therefore, when the electrolyte layer 3 becomes alkaline, the pH indicator mixed in the electrolyte layer 3 is discolored. When the pH indicator mixed in the electrolyte layer 3 is discolored in this way, the state can be observed through the window 7 provided to the housing 6. Accordingly, with the air battery 10, it is possible to detect the entering of water into the housing 6 quickly; thereby, with the air battery 10, it is possible to inhibit deterioration, abnormality, and runaway of the battery. The air battery 10 will be described as follows on the element basis.

<Air Electrode 1>

The air electrode 1 contains: a conductive material, a catalyst, and a binder for binding the conductive material and the catalyst.

The conductive material contained in the air electrode 1 is not specifically limited as long as it is capable of enduring the environment during the operation of the air battery 10 and having conductive property. Examples of the conductive material contained in the air electrode 1 include a carbon material such as carbon black and mesoporous carbon. To inhibit decrease of reaction field and battery capacity, the content of the conductive material in the air electrode 1 is preferably 10 mass % or more. Moreover, to have a configuration which can attain sufficient catalytic function, the content of the conductive material in the air electrode 1 is preferably 99 mass % or less.

Examples of catalyst contained in the air electrode 1 include cobalt phthalocyanine and manganese dioxide. To have a configuration which can attain sufficient catalytic function, the content of the catalyst in the air electrode 1 is preferably 1 mass % or more. Moreover, to inhibit decrease of reaction field and battery capacity, the content of the catalyst in the air electrode 1 is preferably 90 mass % or less.

Examples of the binder contained in the air electrode 1 include polyvinylidene fluoride (PVDF) and polytetrafluoroethylene (PTFE). The content of the binder in the air electrode 1 is not specifically restricted; for example, it is preferably 10 mass % or less, more preferably 1-5 mass %.

The air electrode 1 can be produced by, for example, a method of coating a paint (which consists of: carbon black; a catalyst; and a binder) on the surface of the below-described air electrode current collector by using doctor-blade method. Other than this, the air electrode 1 may also be produced by thermocompression of a mixed powder containing carbon black and a catalyst.

<Anode 2>

The anode 2 contains an alkali metal which functions as an anode active material. The anode 2 is provided with an anode current collector (not shown) which is in contact with the inner or outer face of the anode 2 to collect the current of the anode 2.

Examples of the alkali metal element to be contained in the anode 2 include: Li, Na, and K. Examples of the alkali metal compound to be contained in the anode 2 may be a lithium alloy. When the air battery 10 is a lithium-air secondary battery, in view of providing an air battery 10 which can easily attain high capacity, Li is preferably contained.

The anode 2 is not particularly limited as long as it contains at least an anode active material; it may also contain an conductive material for improving the conductivity and a binder for fixing the alkali metal and so on. To inhibit decrease of reaction field and battery capacity, the content of the conductive material in the anode 2 is preferably 10 mass % or less. The content of the binder in the anode 2 is not particularly limited; it is preferably 10 mass % or less, more preferably 1-5 mass %. Types and content of the conductive material and the binder to be contained in the anode 2 can be the same as those of the air electrode 1.

In the air battery 10, the anode 2 is provided with an anode current collector which is in contact with the inner or outer face of the anode 2. The anode current collector has a function to collect the current of the anode 2. In the air battery 10, the material of the anode current collector is not particularly limited as long as it has electrical conductivity. Examples of the material for the anode current collector include: copper, stainless steel, and nickel. The shape of the anode current collector may be in a form of foil, plate, and mesh (grid). In the air battery 10, the anode 2 can be produced by, for example, the same method as that of the air electrode 1.

<Electrolyte Layer 3>

The electrolyte layer 3 is filled with an electrolyte (liquid or solid) which conducts ions (alkali metal ion) between the air electrode 1 and the anode 2. Moreover, in the air battery 10, the pH indicator is mixed in the electrolyte layer 3. The pH indicator mixed in the electrolyte layer 3 is not specifically limited as long as it is a pH indicator which is discolored in an alkaline state; a known pH indicator can be used. Specific examples of the pH indicator to be contained in the electrolyte layer 3 include: BTB solution, phenolphthalein solution, thymol blue, 1,3,5-trinitrobenzene, and litmus paper.

When an electrolyte (electrolytic solution) is used for the electrolyte layer 3, the type of the electrolytic solution is not specifically restricted as long as it has metal ion conductivity; for example, there may be a non-aqueous electrolytic solution. The types of the non-aqueous electrolytic solution to be used for the electrolyte layer 3 are adequately selected depending on the types of conducting metal ions. For instance, the non-aqueous electrolytic solution of the lithium-air battery usually contains a lithium salt and an organic solvent. Examples of lithium salt include: inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, and $LiC(CF_3SO_2)_3$. Examples of the organic solvent include: ethylene carbonate (EC), propylene carbonate (PC), dimethyl carbonate (DMC), diethyl carbonate (DEC), ethylmethyl carbonate (EMC), butylene carbonate, γ-butyrolactone, sulfolane, acetonitrile, 1,2-dimethoxymethane, 1,3-dimethoxypropane, diethylether, tetrahydrofuran, 2-methyltetrahydrofuran, and the mixture thereof. In view of a configuration where the dissolved oxygen can be used efficiently in the reaction, the organic solvent is preferably a solvent having high oxygen solubility. Concentration of the lithium salt in the non-aqueous electrolytic solution is, for example, 0.2-3 mol/L. In the air battery of the present invention, for example, a low-volatile liquid such as ionic liquid can be used as the non-aqueous electrolytic solution.

In addition, when an electrolytic solution is used for the electrolyte layer 3, the electrolyte layer 3 preferably has a configuration in which an electrolytic solution is held in a separator. Examples of the separator include: porous membranes formed of, for example, polyethylene and polypropylene; nonwoven fabrics such as resin-made nonwoven fabric and glass fiber nonwoven cloth.

<Oxygen Layer 5>

The oxygen layer 5 has a function to guide an oxygen gas existing in the housing 6 to the air electrode 1. The oxygen layer 5 is a pathway of air to be guided to the air electrode 1; for example, a hole which is provided to the air electrode current collector for collecting electric current of the air electrode 1 in a manner to contact with the inner or outer face of the air electrode 1 functions as the oxygen layer 5. In other words, the oxygen layer 5 can be called an air electrode current collector 5.

In the air battery 10, the air electrode current collector has a function to collect the current of the air electrode 1. In the air battery 10, the material of the air electrode current collector is not particularly limited as long as it has electrical conductivity. Examples of the material for the air electrode current collector include: stainless steel, nickel, aluminum, iron, titanium, and carbon. The shape of such an air electrode current collector may, for example, be in a form of mesh (grid).

<Housing 6>

The housing 6 at least incorporates: a power section 4, an oxygen layer 5, and an oxygen-containing gas. In the air battery 10, the shape of the housing 6 is not specifically limited as long as it is provided with a window which allows for visually observing the state of the electrolyte layer 3 from outside the housing 6. The material constituting the housing 6 may be a material usable for the housing of a metal-air battery. The oxygen-containing gas received in the housing 6 (i.e. existing in the space 8) may be, for example, an oxygen gas of which pressure is $1.01 \times 10^5$ Pa and oxygen concentration is 99.99%.

<Window 7>

The window 7 is made of a transparent material which does not react with the constituent material of the power section 4 and which does allow for visually observing the state of the electrolyte layer 3 from outside the housing 6. Examples of the constituent material of the window 7 include PYREX glass ("PYREX" is a trademark of the product manufactured by Corning Incorporated) and silica glass.

In the above description regarding the air battery 10, the power section 4 and the air are separated by the upper face of the housing 6 and the power section 4 is not opened to the air. However, the air battery of the present invention is not limited to this embodiment. The housing of the air battery of the invention may not have an upper lid. It should be noted that, for example, in a case of using an electrolytic solution in the electrolyte layer 3, in view of providing a configuration which is capable of inhibiting depletion of the electrolytic solution, an embodiment where the power section 4 is not opened to the air is preferable.

2. Second Embodiment

Figure 2:
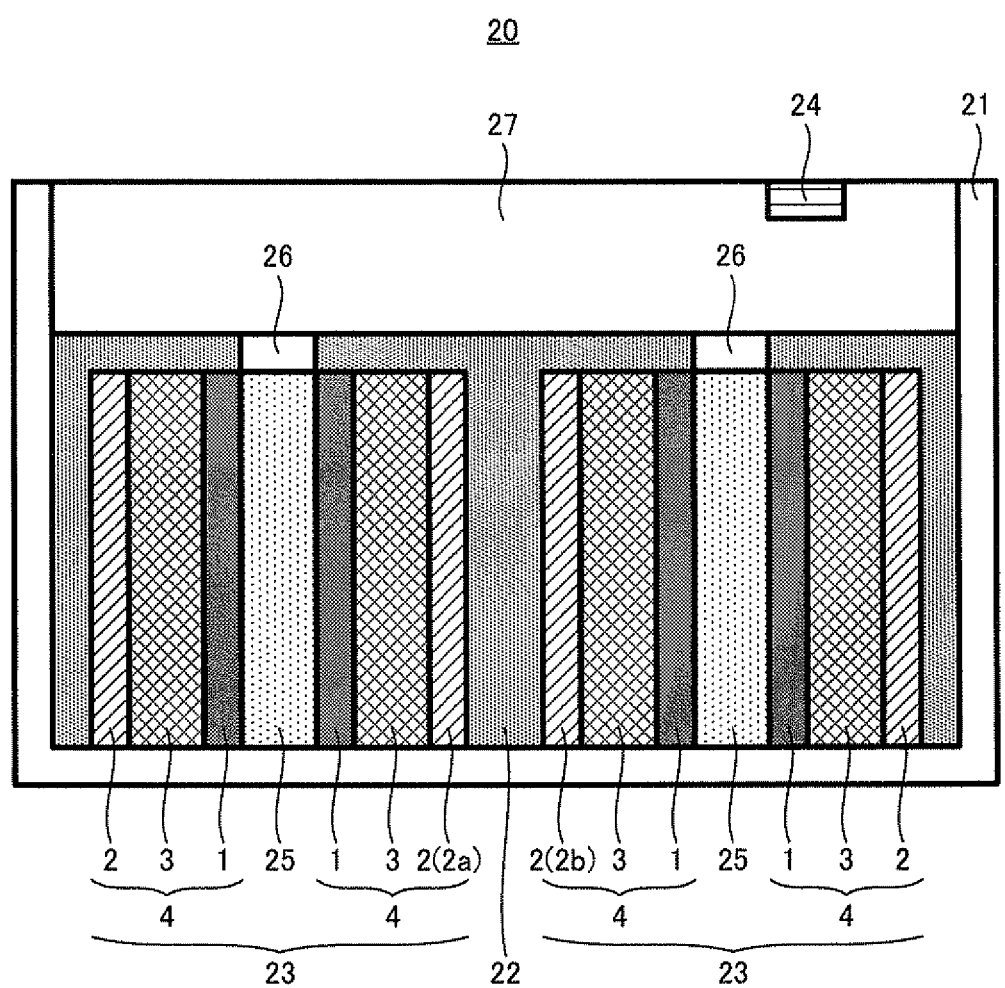
FIG. 2 is a cross-sectional view showing an embodiment of an air battery 20.

FIG. 2 is a cross-sectional view schematically showing an embodiment of an air battery 20. FIG. 2 extracts a part of the air battery 20 and enlarges the part. In FIG. 2, to the elements having the same structure as those in the air battery 10, the same reference numerals as those used in FIG. 1 are given and the explanation thereof is omitted.

As shown in FIG. 2, the air battery 20 comprises: a housing 21; an electrolytic solution 22 in which a pH indicator is mixed; and stacked structures 23,23 arranged in the electrolytic solution 22. The housing 21 is provided with a window 24. The window 24 is disposed at a position which allows for visually observing the state of the electrolytic solution 22 from outside the housing 21. Inside the housing 21 is a closed space; an oxygen-containing gas is filled between the upper face of the housing 21 and the electrolytic solution 22. The stacked structure 23 of the air battery 20 has a structure where the power sections 4, 4 are symmetrically arranged with respect to the oxygen layer 25. The oxygen-containing gas, which is filled in a space 27 located at the upper side in relation to the electrolytic solution 22, diffuses into the oxygen layers 25, through the oxygen flow paths 26, 26 which connects the oxygen layers 25, 25 to the space 27.

When the water entered into the housing 21 in emergency situations reacts with an alkali metal contained in the anodes 2, 2 arranged in the electrolytic solution 22, an alkaline substance is produced. As shown in FIG. 2, since the anodes 2, 2, . . . and the electrolytic solution 22 are in contact with each other, once an alkaline substance is produced by reaction of water with one of the anodes 2 or a plurality of the anodes 2, 2, . . . , the electrolytic solution 22 also becomes alkaline. As described above, since the pH indicator is mixed in the electrolytic solution 22, when the electrolytic solution 22 becomes alkaline, the pH indicator mixed in the electrolytic solution 22 is discolored. When the pH indicator mixed in the electrolytic solution 22 is discolored in this way, the state can be observed through the window 24 provided to the housing 21. Accordingly, with the air battery 20, it is possible to detect the entering of water into the housing 21 quickly; thereby, with the air battery 20, it is possible to inhibit deterioration, abnormality, and runaway of the battery. The air battery 20 will be described as follows on the element basis.

<Housing 21>

The housing 21 at least incorporates: an electrolytic solution 22; stacked structures 23, 23, . . . ; and an oxygen-containing gas. In the air battery 20, the shape of the housing 21 is not particularly limited as long as it has a structure which is capable of sealing inside the housing 21 to inhibit depletion of the electrolytic solution 22 and has a window 24 which allows for visually observing the state of the electrolytic solution 22 from outside the housing 21. The material constituting the housing 21 may be the same as that of the housing 6. The oxygen-containing gas received in the housing 21 (i.e. existing in the space 27) may be, for example, an oxygen gas of which pressure is $1.01 \times 10^5$ Pa and oxygen concentration is 99.99%.

<Electrolytic Solution 22>

In the electrolytic solution 22, a pH indicator is mixed. The pH indicator mixable in the electrolytic solution 22 may be the one equivalent to the pH indicator which may be contained in the electrolyte layer 3. Specific examples of the electrolytic solution 22 may be the one equivalent to an electrolytic solution usable for the electrolyte layer 3.

<Stacked Structure 23>

The stacked structure 23 has a structure where the power sections 4, 4, are symmetrically arranged with respect to the oxygen layer 25. With this configuration, power (power density) per unit volume of the stacked structure 23 can be easily improved. In the air battery 20, the air electrodes 1, 1, . . . and the anodes 2, 2, respectively composing the power sections 4, 4, . . . arranged in the electrolytic solution 22 may be electrically-connected in series or in parallel. In any connecting ways, since the pH indicator is mixed in the electrolytic solution 22 contacting the anodes 2, 2, . . . , once an alkaline substance is produced by the reaction of water with one of the anodes 2 or a plurality of the anodes 2, 2, . . . , it is possible to discolor the pH indicator mixed in the electrolytic solution 22. Then, the state can be observed through the window 24.

<Window 24>

The window 24 is made of a transparent material which does not react with the battery's constituent material received in the housing 21 and which does allow for visually observing the state of the electrolytic solution 22 from outside the housing 21. The window 24 can be produced by a material equivalent to the material of the window 7.

<Oxygen Layer 25>

The oxygen layer 25 has a function to guide an oxygen-containing gas which has been supplied through the below-described oxygen flow path 26 to the air electrodes 1, 1. The oxygen layer 25 is a pathway of air to be guided to the air electrodes 1, 1; for example, a hole which is provided to the air electrode current collector for collecting electric current of the air electrodes 1, 1 in a manner, for example, to contact with the outer face of the air electrodes 1, 1 functions as the oxygen layer 25. In other words, the oxygen layer 25 can be called an air electrode current collector 25.

<Oxygen Flow Path 26>

The oxygen flow path 26 is a pathway of oxygen to guide the oxygen-containing gas existing in the space 27 to the oxygen layer 25. The configuration of the oxygen flow path 26 is not particularly limited as long as it can attain the above function. The oxygen flow path 26 can be, for example, formed of a tubular member formed of a material equivalent to that of the housing 21.

In the above description regarding the air battery 20, an embodiment where the stacked structures 23, 23 are arranged at an interval. However, the air battery of the invention is not limited to the embodiment; it may have other configurations where the anode 2a and the anode 2b in FIG. 2 contact with each other or where the anode 2a and the anode 2b are formed by a single member (namely, the stacked structures 23, 23 are integrally formed).

3. Third Embodiment

Figure 3:
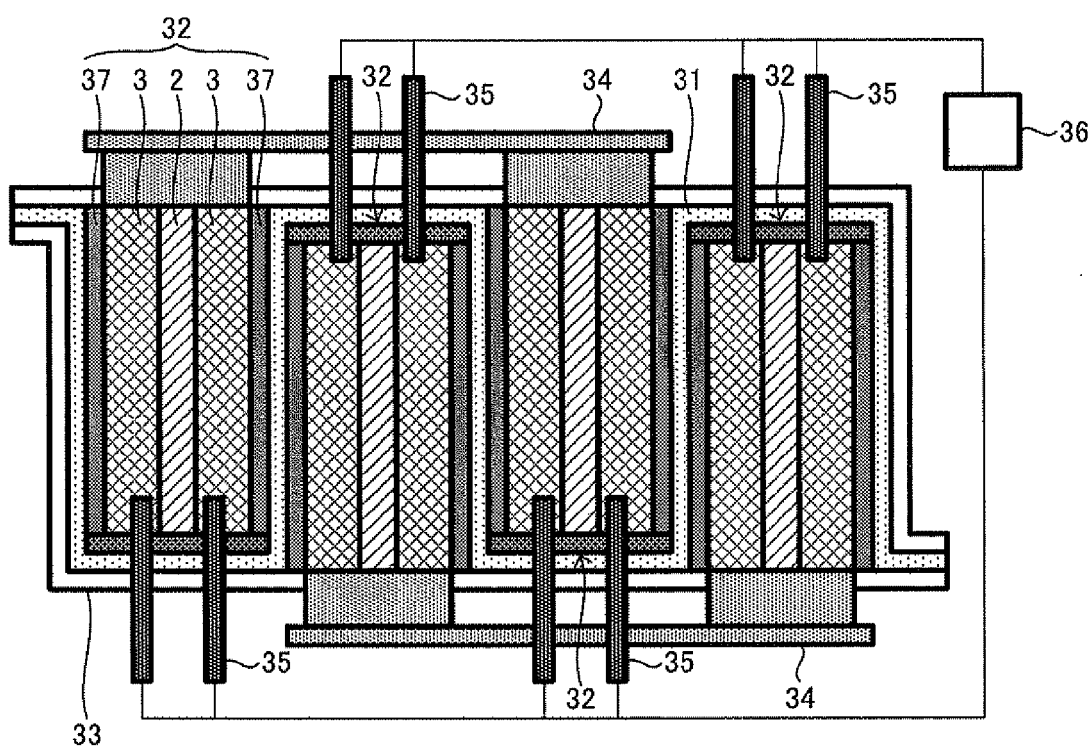
FIG. 3 is a cross-sectional view showing an embodiment of an air battery 30.

FIG. 3 is a cross-sectional view schematically showing an embodiment of an air battery 30. FIG. 3 extracts a part of the air battery 30 and enlarges the part. In FIG. 3, to the elements having the same structure as those in the air battery 10, the same reference numerals as those used in FIG. 1, are given and the explanation thereof is omitted. It should be noted that, in FIG. 3, as a matter of convenience, pH meters 35, 35, . . . are shown in a manner to penetrate, for instance, the flow path 31 and containers 34, 34; the actual pH meters 35, 35, . . . are inserted into the electrolyte layer 3, 3, . . . from the front side of the sheet of FIG. 3 for example.

As shown in FIG. 3, the air battery 30 comprises: a housing 33 receiving a flow path 31 in which a hydrogen-containing gas pass through and stacked structures 32, 32, . . . ; and containers 34, 34 being filled with an electrolytic solution. To each of the electrolyte layers 3, 3, . . . provided to each of the stacked structures 32, 32, . . . , a pH meter 35 is respectively inserted; and each of the pH meters 35, 35, . . . is connected to an output means 36 which outputs electronic signals when the pH value exceeds the threshold level. The stacked structure 32 comprises: air electrodes 37, 37 disposed at the right-and-left ends; an anode 2 disposed in the center; and electrolyte layers 3, 3 respectively arranged between the anode 2 and each of the air electrodes 37, 37, wherein the air electrodes 37, 37, and the anode 2 respectively contact with the electrolyte layers 3, 3. The container 34 is connected to four electrolyte layers 3, 3, . . . (two of four electrolyte layers are provided to each of two stacked structures 32, 32); the electrolytic solution is supplied to the electrolyte layers 3, 3, . . . from the container 34. In the air battery 30, the oxygen-containing gas passing through the flow path 31 is supplied to the air electrodes 37, 37, . . . of each stacked structure 32.

When the water entered into the housing 33 in emergency situations reacts with an element or a compound of an alkali metal contained in the anode 2, 2, . . . , an alkaline substance is produced. As above, in the air battery 30, a pH meter 35 is inserted into each of the electrolyte layers 3, 3, . . . . Because of this, for example, when an alkaline substance is produced by the reaction of water with one of the anodes 2, pH of the electrolyte layer 3 in contact with the anode 2 varies; thereby it is possible to detect the pH variation by the pH meter 35. In the air battery 30, the results of pH variation is outputted towards the output means 36. As described above, since the output means 36 outputs electronic signals when the pH value exceeds the threshold level, with the air battery 30, it is possible to detect the entering of water into the housing 33 quickly by the electronic signals outputted by the output means 36. Accordingly, with the air battery 30, it is possible to inhibit deterioration, abnormality, and runaway of the battery. The air battery 30 will be described as follows on the element basis.

<Flow Path 31>

The flow path 31 is a passage of oxygen-containing gas to be guided to the air electrodes 37, 37, . . . . The flow path 31 is formed of, for example, a porous material or a mesh-type tubular member those of which do not react with an electrolytic solution provided in the electrolyte layers 3, 3, . . . . The oxygen-containing gas which passes through the flow path 31 may be, for example, the one having a pressure of $1.01 \times 10^5$ Pa and an oxygen concentration of 99.99%.

<Stacked Structure 32>

The stacked structure 32 comprises: air electrodes 37, 37 disposed at the right-and-left ends; an anode 2 disposed in the center; and electrolyte layers 3, 3 respectively arranged between the anode 2 and each of the air electrodes 37, 37, wherein the air electrodes 37, 37 and the anode 2 respectively contact with the electrolyte layers 3, 3. With this configuration, power (power density) per unit volume of the stacked structure 32 can be easily improved. In the air battery 30, the air electrodes 37, 37, . . . and the anodes 2, 2, . . . may be electrically-connected in series or in parallel. In any connecting ways, it is possible to detect the entering of water into the housing 33 quickly by the pH meters 35, 35, . . . and the output means 36, the pH meters 35, 35, . . . being inserted into the electrolyte layers 3, 3, . . . .

<Housing 33>

The housing 33 at least incorporates: a flow path 31; and stacked structures 32, 32, . . . . The side face of the housing 33 (i.e. side faces shown at the upper and lower sides of the sheet of FIG. 3) has connectors for connecting to the containers 34, 34; when the containers 34, 34 are connected to the connectors, the electrolytic solution can be supplied from the containers 34, 34 to the electrolyte layers 3, 3, . . . incorporated in the housing 33. The material constituting the housing 33 may be the same as that of the housing 6.

<Container 34>

The container 34 is filled with an electrolytic solution to be supplied to the electrolyte layers 3, 3, . . . . The container 34 is provided with a connector used for connecting the container 34 to the side face of the housing 33. When the container 34 is connected to the housing 33, the electrolytic solution is supplied to the electrolyte layers 3, 3 through the connectors. The container 34 may be formed of a known material which does not react with the electrolytic solution.

<pH Meter 35>

The pH meter 35 functions as a pH-detecting means in the air battery 30. In the air battery 30, pH variation in the electrolyte layers 3, 3, . . . is detected by using the pH meter 35 and then the detection results are outputted to the output means 36. In the air battery 30, the pH meter 35 may be a known pH meter.

<Output Means 36>

The output means 36 is connected to the pH meters 35, 35, . . . with or without wires and outputs electronic signals when the pH value detected by the pH meters 35, 35, . . . exceeds the threshold level. In the air battery 30, with the electronic signals outputted by the output means 36, it is possible to find out the entering of water into the housing 33 quickly.

<Air Electrode 37>

The air electrode 37 contains a conductive material, a catalyst, and a binder for binding the conductive material and the catalyst. The air electrode 37 is provided with an air electrode current collector (not shown) which is in contact with the inner or outer face of the air electrode 37 to collect the current of the air electrode 37. Types and content of the conductive material, catalyst, and the binder to be contained in the air electrode 37 can be the same as those of the air electrode 1.

In the above description regarding the air battery 30, an embodiment where the electrolyte layers 3, 3, . . . are filled with the electrolytic solution is shown. However, the air battery of the invention is not limited to the embodiment. It may have a configuration in which the a solid electrolyte is provided to the electrolyte layers 3, 3, . . . and the containers 34, 34.

Moreover, in the above description regarding the air battery 30, an embodiment where the output means 36 is provided together with the pH meters 35, 35, . . . . However, the air battery of the invention is not limited to the embodiment. It may have a configuration without the output means 36. It should be noted that, to have a configuration which is capable of easily detecting the entering of water into the housing 33, the air battery of the invention preferably has the output means 36 together with the pH meters 35, 35, . . . .

Further, in the above description regarding the air battery of the invention, the air batteries 10, 20 using the pH indicator as the pH-detecting means and the air battery 30 using the pH meters 35, 35, . . . are shown. However, the air battery of the invention is not limited to the embodiment. Other pH-detecting means may be used as long as those can detect pH variation attributed to an alkaline substance produced by the reaction of an alkali metal and water. Still further, the air battery of the invention may have a configuration which uses a plural types of pH-detecting means (for example, the pH indicator and the pH meter) in combination.

Examples of types of the above described air batteries 10, 20, 30 of the present invention include: a lithium-air battery, a sodium-air battery, and a potassium-air battery. In view of providing an air battery with higher capacity, a lithium-air battery is preferable. In addition, examples of the usage of the air batteries 10, 20, 30 of the invention include: applications for vehicle, stationary power source, domestic power source, and portable information equipments.

As above, the air batteries 10, 20, 30 of the present invention in which alkali metal is contained in the anode 2 have been described; the technical ideas of the present invention can be applied to an air battery which is provided with an anode containing Group-II element (for example, Mg and Ca) and Group-III element (for example, Al).

INDUSTRIAL APPLICABILITY

The air battery of the present invention can be used for, for example, power source of electric vehicles and a portable information equipment.

The invention claimed is:

1. An air battery comprising: a power section which comprises an air electrode, an anode containing an alkali metal, and an electrolyte layer containing an electrolyte for conducting ion between the air electrode and the anode; and a housing configured to receive the power section,
    an non-aqueous electrolytic solution being used for the electrolyte layer, and a pH-detecting means being provided inside the housing.

2. The air battery according to claim 1, wherein the pH-detecting means contains a pH indicator and a window which allows for visually observing the pH indicator from outside the housing is provided to the housing.

3. The air battery according to claim 2 further comprising an output means which outputs electronic signals when a pH value detected by the pH-detecting means exceeds the threshold level.

4. The air battery according to claim 2, wherein the pH indicator is mixed in the electrolyte layer.

5. The air battery according to claim 4 further comprising an output means which outputs electronic signals when a pH value detected by the pH-detecting means exceeds the threshold level.

6. The air battery according to claim 1 further comprising an output means which outputs electronic signals when a pH value detected by the pH-detecting means exceeds the threshold level.

7. A method for detecting water in an air battery, wherein the air battery comprises: a power section which comprises an air electrode, an anode containing an alkali metal, and an electrolyte layer containing an electrolyte for conducting ion between the air electrode and the anode; and a housing configured to receive the power section, a pH-detecting means being provided inside the housing; and water entering into the housing is detected by detecting pH in the housing by the pH-detecting means.

* * * * *